May 30, 1950 W. F. BENNING 2,509,625
SPRING SUSPENSION
Filed Feb. 1, 1945 3 Sheets-Sheet 1
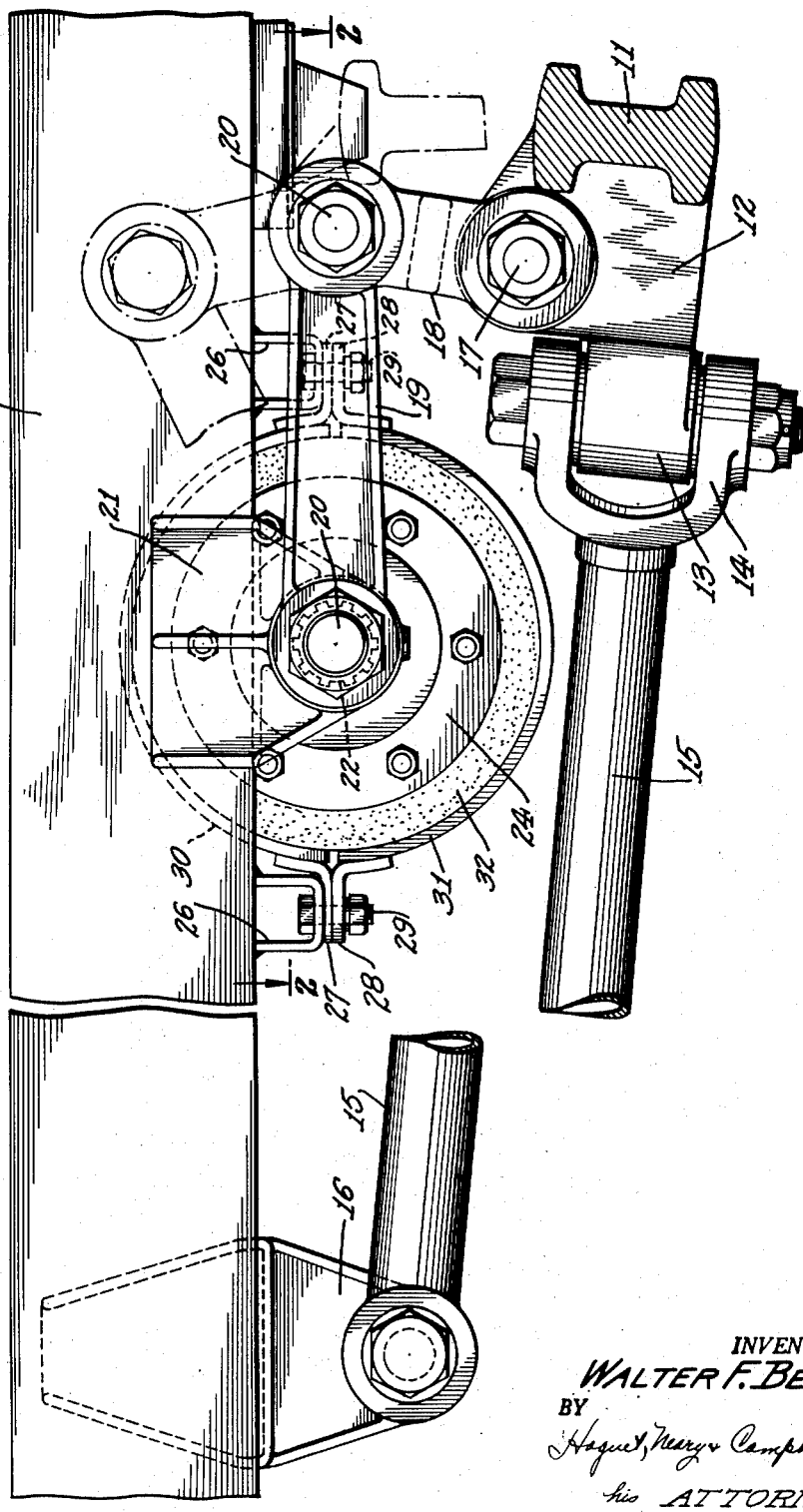
INVENTOR.
WALTER F. BENNING
BY
his ATTORNEYS

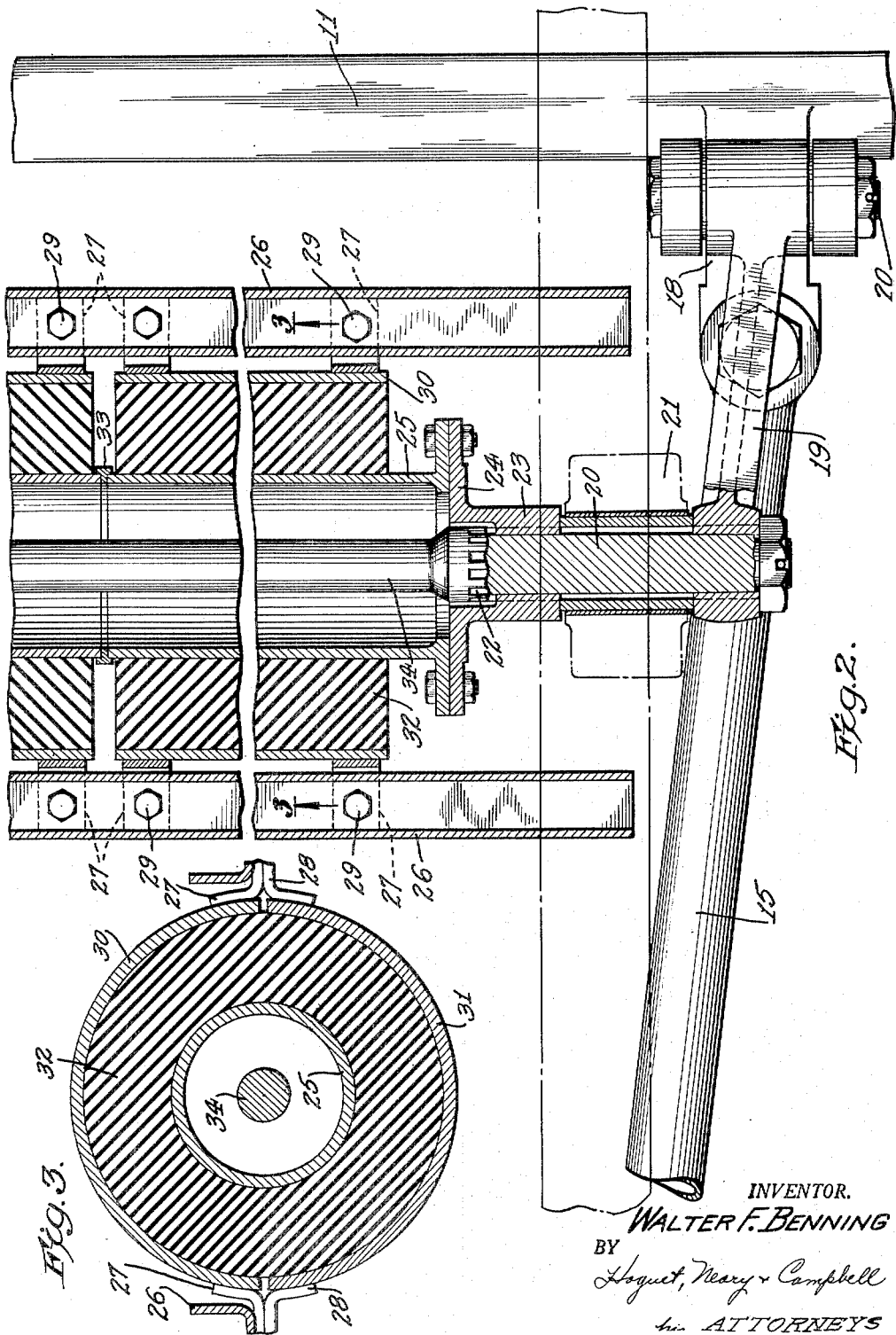

May 30, 1950  W. F. BENNING  2,509,625
SPRING SUSPENSION
Filed Feb. 1, 1945  3 Sheets-Sheet 3

INVENTOR.
WALTER F. BENNING
BY Hoguet, Neary & Campbell
his ATTORNEYS

Patented May 30, 1950

2,509,625

UNITED STATES PATENT OFFICE 2,509,625

SPRING SUSPENSION

Walter F. Benning, Toledo, Ohio, assignor to Mack Manufacturing Corporation, New York, N. Y., a corporation of Delaware Application February 1, 1945, Serial No. 575,717

3 Claims. (Cl. 267—21)

The present invention relates to mechanisms by means of which a vehicle frame is mounted upon the vehicle wheels and embodies, more specifically, an improved spring suspension for vehicles wherein the vehicle wheels are mounted upon the frame by means of a spring suspension wherein the yieldable support of the frame on the wheels is accomplished by means of subjecting a body of yielding non-metallic material to torsional stresses.

Simplicity of design and structure, as well as ease of manufacture and assembly, are important advantages secured by the present invention, although other advantages will appear as the invention is described in connection with the accompanying drawings, wherein Figure 1 is a view in end elevation showing a vehicle spring suspension mechanism constructed in accordance with the present invention;

Figure 2 is a view in horizontal section, taken on the line 2—2 of Figure 1, and looking in the direction of the arrows;

Figure 3 is a view in vertical section, taken on the plane indicated by the line 3—3 in Figure 2, and looking in the direction of the arrows;

Figure 4:
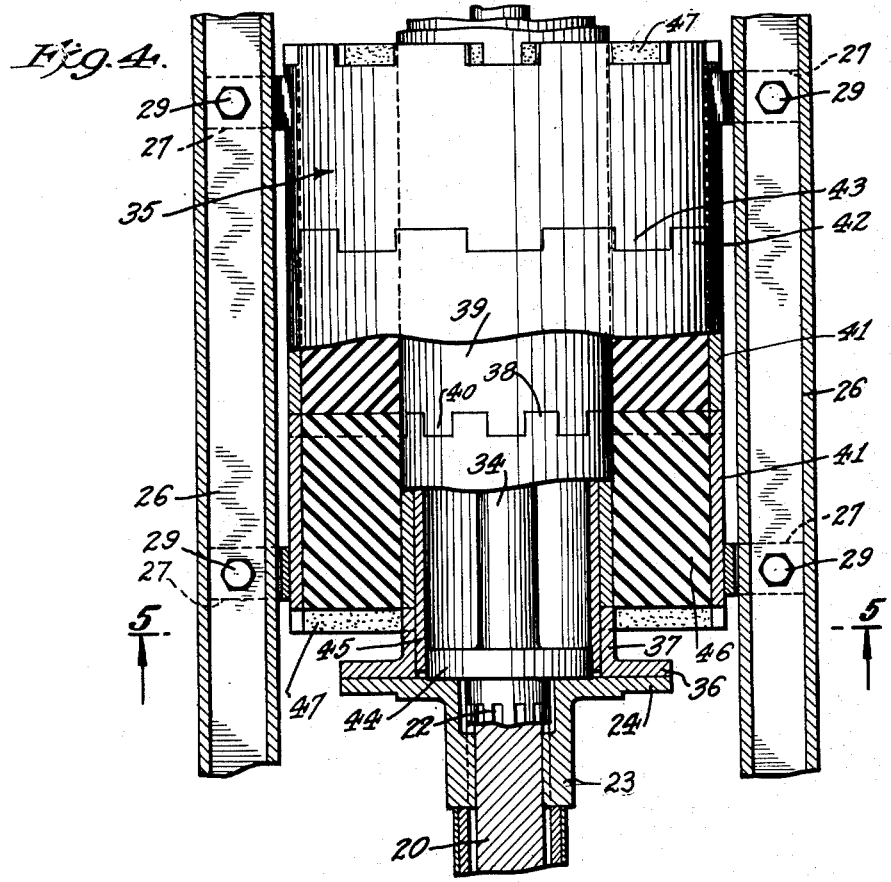
Figure 4 is a view similar to Figure 2, showing a modified form of the invention.

Referring to the above drawings and particularly to Figures 1, 2, and 3, the frame member of a motor vehicle is illustrated at 10, and an axle member of the vehicle at 11. A wheel or wheels may be carried by the axle 11 in accordance with standard practice, and the axle is provided with an enlarged bracket member 12 provided with a bushing 13, which is adapted to receive the forked end 14 of a rod 15 to afford a pivotal connection. The other end of the rod 15 is pivoted upon a bracket 16 carried by the frame member 10, thus to provide a suitable drag link for maintaining the axle 11 in desired positions with respect to the frame 10.

The bracket 12 is also formed with a pivot element 17, which is adapted to receive a link 18 which is pivotally connected at its other end to an arm 19 at pivot connection 20.

Referring to Figure 2, the arm 19 is splined or otherwise fixedly secured to a transverse rod or shaft 20, which is journaled in a bracket 21, fixedly secured to the frame member 10.

On the inner side of the bracket 21, the rod 20 is formed with splines 22 and a sleeve 23, formed with mating splines, is mounted thereon. Sleeve 23 is formed with a flange 24, which is secured to a hollow cylindrical tube 25.

Transverse U-shaped supporting members 26 are secured between the frame members 10 and are adapted to receive flanges 27 and 28, bolts 29 serving to secure the flanges to the supports 26. The flanges 27 are secured to a semi-cylindrical plate 30, while the flanges 28 are secured to a semi-cylindrical plate 31 so that, when the flanges 27 and 28 are secured in the position shown in Figure 1, the plates 30 and 31 form a substantially complete hollow cylinder which is concentric to the tube 25.

Between the plates 30, 31 and the tube 25 a tube of yielding non-metallic material 32 is secured. The structure is such that the outer surface of the tube 32 is rigidly secured to the hollow plates 30 and 31, while the inner cylindrical surface is rigidly secured to the hollow tube 25.

It will be seen that the foregoing mechanism provides a spring suspension wherein movement of the axle 11 with respect to the frame 10 causes a corresponding rotative motion between the tube 25 and the plates 30, 31. This motion is yieldingly resisted by the tube of yielding non-metallic material 32 to provide a spring suspension for the vehicle. As will appear in Figure 2, the mechanism is duplicated on each side of the frame, and a suitable bushing 33 is provided between the adjacent ends of the tubes 25.

In addition to the foregoing, it may be desirable to provide a mechanism by means of which relative vertical movement between the wheels upon opposite sides of the vehicle may be yieldingly resisted. To this end, the rod 20 is formed as an elongated torsion bar 34 and is unitary with the wheel mounting structure on the opposite side of the vehicle frame. The torsion bar 34 thus yieldingly resists relative vertical movement between the wheels on opposite sides of the vehicle and tends to equalize the stresses therebetween.

Figure 5:
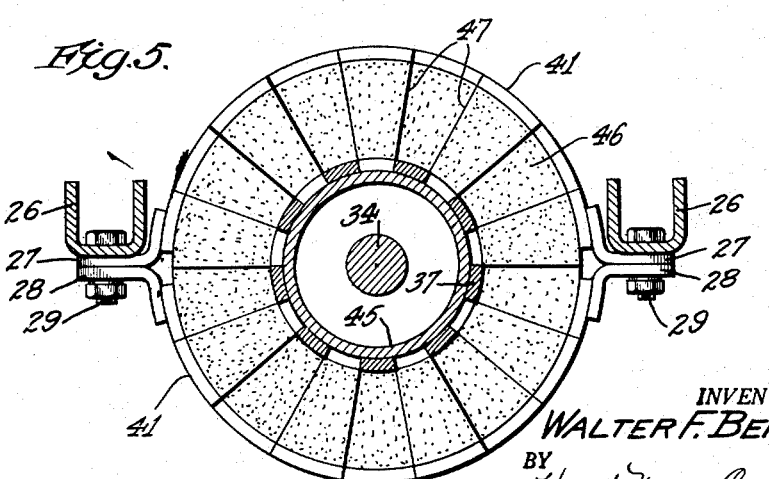
Figure 5 is a view in section, taken on the line 5—5 of Figure 4, and looking in the direction of the arrows.

In the structure shown in Figures 4 and 5, there is provided means for increasing or decreasing the capacity of the spring suspension. This is accomplished by providing a sectionalized yielding non-metallic element, the sections thereof being indicated generally at 35 in Figure 4. The flange 24 is secured to a flange 36 formed on a tube section 37. Tube section 37 corresponds to the tube 25 in Figure 2 and, at its remote end, is formed with a series of teeth 38. The remaining suspension elements 35 are formed with inner tube sections 39 having teeth 40 that are adapted to be received between the teeth 38, The outer cylindrical plates 30 and 31 in Figures 1 and 2 are formed, in the modification shown in Figures 4 and 5, as ring sections 41 having interengaging teeth 42 and 43. One or more of the ring sections 41 may be anchored to the supports 26. In Figure 4 the intermediate section is shown as not being anchored but, by means of the interengaging teeth 42 and 43, the section serves equally with the other sections as a cushioning element.

To facilitate the mounting of the sections 35 in the position illustrated in Figure 4, the rod 20 is formed with a flange 44 over which a guide tube 45 is provided. The tube sections 37 and 39 fit over the tube 45 and facilitate the mounting and supporting of the elements in the position shown.

Each of the sections 35 is provided with a ring of yielding non-metallic material 46, the opposite ends of such rings being formed with teeth 47 that align with the teeth 38, 40 and 42, 43 in the tubes 37, 39 and external ring sections 41.

It will thus be seen that the number of sections 35 in the modification shown in Figures 4 and 5 may be varied to increase or diminish the capacity of the spring suspension.

While the invention has been described with reference to the specific forms shown in the drawings, it is not to be limited save as defined in the appended claims.

I claim:

1. A vehicle spring suspension comprising a vehicle frame, a road wheel supporting member, yielding non-metallic means comprising a plurality of annular elements arranged end to end and having longitudinal projections and recesses peripherally spaced at their adjacent ends and interlockingly engaged against relative rotation and further having exterior and interior cylindrical surfaces, means to secure the exterior surfaces of at least one of said elements non-rotatably to said frame, a tube secured to the interior surface of at least one of said annular elements, a torsion bar within said tube releasably secured to one end only of said tube, an arm secured to said bar and a pivot connection between said arm and said road wheel supporting member.

2. A vehicle spring suspension comprising a vehicle frame, a road wheel supporting member, yielding non-metallic annular elements having longitudinal projections and recesses peripherally spaced at their adjacent ends and interlockingly engaged against relative rotation and further having exterior and interior cylindrical surfaces, means for securing the exterior surfaces of the first and last of said annular elements non-rotatably to said frame, a tube secured to the interior surface of at least one of said annular elements, a torsion bar torsionally rotatable within said tube and secured to one end only of said tube, an arm secured to said bar and a pivot connection between said arm and said road wheel supporting member.

3. A vehicle spring suspension comprising a vehicle frame, an axle carrying a road wheel, a yielding means interposed between said frame and said road wheel supporting member, said yielding means comprising a plurality of annular units, each of which comprises an inner and an outer sleeve and an interposed annular rubber member non-rotatably connected to said sleeves, said sleeves and annular rubber member of said units being provided with projections and recesses at their ends for interlocking engagement between said units, means securing at least one of said outer sleeves rigidly to said vehicle frame, a torsion bar torsionally rotatable within said inner sleeves and secured to one end only of one of said inner sleeves, an arm secured to said bar and a pivot connection between said arm and said axle.

WALTER F. BENNING.

REFERENCES CITED

The following references are of record in the file of this patent:

UNITED STATES PATENTS

| Number | Name | Date |
|---|---|---|
| 1,560,655 | Brewster | Nov. 10, 1925 |
| 1,753,985 | Flintermann | Apr. 8, 1930 |
| 2,051,864 | Knox et al. | Aug. 25, 1936 |
| 2,088,341 | Rabe | July 27, 1937 |
| 2,105,132 | Soehner et al. | Jan. 11, 1938 |
| 2,166,774 | Tjaarda | July 18, 1939 |
| 2,241,827 | Rabe | May 13, 1941 |
| 2,246,848 | Hicks | June 24, 1941 |
| 2,264,023 | Faber | Nov. 25, 1941 |
| 2,286,609 | Ledwinka | June 16, 1942 |
| 2,371,864 | Woolson et al. | Mar. 20, 1945 |

FOREIGN PATENTS

| Number | Country | Date |
|---|---|---|
| 505,341 | Great Britain | May 9, 1939 |